(12) United States Patent
Vierk et al.

(10) Patent No.: US 8,905,212 B2
(45) Date of Patent: Dec. 9, 2014

(54) SYNCHRO-LOCK CLUTCH-COMBINATION FRICTION AND MECHANICAL LOCKING CLUTCH

(75) Inventors: David Vierk, Mokena, IL (US); James G. Marciniak, Riverside, IL (US); Steven Kowal, Naperville, IL (US); James R. Papania, Bolingbrook, IL (US)

(73) Assignee: BorgWarner, Inc., Auburn Hills, MI (US)

( * ) Notice: Subject to any disclaimer, the term of this patent is extended or adjusted under 35 U.S.C. 154(b) by 759 days.

(21) Appl. No.: 12/937,422

(22) PCT Filed: Apr. 9, 2009
(Under 37 CFR 1.47)

(86) PCT No.: PCT/US2009/040012
§ 371 (c)(1),
(2), (4) Date: Feb. 1, 2011

(87) PCT Pub. No.: WO2009/129113
PCT Pub. Date: Oct. 22, 2009

(65) Prior Publication Data
US 2011/0155530 A1  Jun. 30, 2011

Related U.S. Application Data

(60) Provisional application No. 61/045,477, filed on Apr. 16, 2008.

(51) Int. Cl.
| | | |
|---|---|---|
| *F16D 11/10* | (2006.01) | |
| *F16D 13/70* | (2006.01) | |
| *F16D 47/00* | (2006.01) | |
| *F16D 11/14* | (2006.01) | |
| *F16D 13/38* | (2006.01) | |
| *F16D 21/00* | (2006.01) | |

(52) U.S. Cl.
CPC ............... *F16D 11/14* (2013.01); *F16D 13/38* (2013.01); *F16D 21/00* (2013.01)
USPC ........................................................ 192/53.1

(58) Field of Classification Search
USPC ..................... 192/48.3, 48.5, 53.1
See application file for complete search history.

(56) References Cited

U.S. PATENT DOCUMENTS 3,063,529 A * 11/1962 Cook ........................ 192/53.5
3,252,553 A * 5/1966 Peterson ..................... 192/48.7

(Continued)

FOREIGN PATENT DOCUMENTS

WO    WO 2009/129113 A2    10/2009

*Primary Examiner* — Rodney H Bonck
*Assistant Examiner* — Stacey Fluhart
(74) *Attorney, Agent, or Firm* — Miller, Matthias & Hull LLP

(57) ABSTRACT

A composite clutch used to transmit an operational range of torques from a driving member to a driven member includes a friction clutch assembly and a dog clutch assembly. The friction clutch assembly includes a number of first friction clutch members coupled to the driving member and a number of second friction clutch members coupled to the driven member. The number of first friction clutch members and the number of second friction clutch members are selected to transmit torque across a first portion of the operational range of torques. An actuator assembly is operatively coupled to the friction clutch assembly and the dog clutch assembly. The composite clutch may be operated in friction clutch and dog modes to provide improved controllability in lower torque operation.

7 Claims, 3 Drawing Sheets

(56) References Cited

U.S. PATENT DOCUMENTS

| | | | |
|---|---|---|---|
| 3,300,004 A * | 1/1967 | Peterson | 192/48.7 |
| 3,680,409 A * | 8/1972 | Chamberlain | 475/300 |
| 4,349,091 A | 9/1982 | Miyake et al. | |
| 4,807,732 A * | 2/1989 | Lehle | 192/48.5 |
| 4,811,825 A | 3/1989 | Christian et al. | |
| 5,339,936 A | 8/1994 | Lauer et al. | |
| 5,975,263 A | 11/1999 | Forsyth | |
| 6,085,880 A | 7/2000 | Kuhn et al. | |
| 6,557,682 B2 * | 5/2003 | Imamura | 192/48.5 |
| 6,736,747 B1 | 5/2004 | Stafford | |
| 6,852,059 B2 | 2/2005 | Lee et al. | |
| 6,889,804 B2 | 5/2005 | Inoue et al. | |
| 6,966,805 B1 | 11/2005 | Caldwell | |
| 7,055,644 B2 | 6/2006 | Merz | |
| 7,086,515 B2 | 8/2006 | Kelley, Jr. et al. | |
| 7,258,218 B2 | 8/2007 | Kinpara | |
| 7,284,647 B2 | 10/2007 | Onishi et al. | |
| 7,349,785 B2 | 3/2008 | Lee et al. | |
| 2003/0089569 A1 | 5/2003 | Antonov et al. | |
| 2006/0163020 A1 | 7/2006 | Schmidt et al. | |
| 2011/0094843 A1 * | 4/2011 | Knowles | 192/20 |

* cited by examiner

SYNCHRO-LOCK CLUTCH-COMBINATION FRICTION AND MECHANICAL LOCKING CLUTCH

CROSS-REFERENCE TO RELATED APPLICATIONS

This is a U.S. National Stage patent application under 35 USC §371 of PCT application no. PCT/US09/40012 filed Apr. 9, 2009, itself claiming priority under 35 USC §119 (e) to U.S. Provisional Patent Application No. 61/045,477 filed on Apr. 16, 2008.

FIELD OF THE DISCLOSURE

The present disclosure generally relates to torque transmission components, and more particularly relates to clutches used to transmit torque in vehicles.

BACKGROUND OF THE DISCLOSURE

Various types of clutches have been used to transmit torque in vehicles. In a vehicle having an automatic transmission, for example, multiple clutches are used to engage or disengage selected gearsets to obtain a desired gear ratio. The clutches provided for this purpose are typically friction plate clutches, which include a plurality of inner or drive plates that are splined to a rotatable hub. A housing or case is coaxially aligned with the hub and supported for rotation independent of the hub. A plurality of outer or driven plates are splined to the housing or case and are interposed between the drive plates, such that the drive and driven plates are alternately arranged on a common axis. The drive plates include a friction material on one or both sides of the plates. An actuator, such as a hydraulic piston, applies a pressure force that presses the drive and driven plates into engagement, thereby permitting torque to be transferred from the hub to the housing.

The number of plates used in a friction plate clutch is typically selected to transmit a maximum desired torque. Due to space constraints and a maximum pressure force that can be generated by the actuator, higher torque transfer is typically achieved by providing additional plates. As a result, friction plate clutches commonly use several plates to meet the maximum torque design. When the clutch is unengaged or idling, however, the plates generate a parasitic drag torque due to the viscous shearing action which exists between the drive and driven plates as they rotate at different speeds relative to one another. This drag torque adversely affects vehicle fuel economy for automatic transmissions, and therefore the use of excessive plates exacerbates this problem.

The use of numerous friction plates also reduces the controllability of the friction clutch in the lower torque range. The relationship between actuator pressure and the amount of torque transfer produced by a friction plate clutch is substantially linear, as illustrated by the dashed line 4 in FIG. 1. For a given increase in actuator pressure, the increase in torque is relatively large when a large number of friction plates are used. This results in a relatively steep incline as shown by the curve 4, which indicates a high sensitivity of the clutch to pressure. As noted above, the actuator is typically a hydraulic actuator that uses hydraulic fluid to generate the actuator pressure. The hydraulic fluid flows through a hydraulic valve, such as a solenoid valve, having a controller operably coupled thereto. The increased sensitivity to actuator pressure exhibited by conventional friction plate clutches makes it more difficult to control the hydraulic valve to obtain the desired torque.

Synchronizing clutches are known that employ both friction plates and a dog or mechanical connection. U.S. Pat. No. 6,966,805 to Caldwell, for example, discloses a marine transmission having a friction mechanism to at least partially synchronize the rotational speed of a driving shaft and a driven shaft prior to engagement of a dog clutch element. While the friction mechanism transfers some torque, it only begins to rotate the driven shaft so that it is sufficiently synchronized with the driving shaft, and is not intended to operate over any appreciable portion of the operational torque range of the transmission.

SUMMARY OF THE DISCLOSURE

In accordance with one aspect the disclosure, a composite clutch for transmitting an operational range of torques from a driving member to a driven member is provided having a friction clutch assembly. The friction clutch assembly includes a number of first friction clutch members coupled to the driving member and a number of second friction clutch members coupled to the driven member. The first and second friction clutch members are movable from an unengaged position to a torque transmitting position, wherein the number of first friction clutch members and the number of second friction clutch members are selected to transmit torque across a first portion of the operational range of torques. A dog clutch assembly includes a first dog member coupled to the driving member and a second dog member coupled to the driven member, wherein the first and second dog members are movable from a disengaged position to an engaged position in which the first and second dog members mechanically lock with one another. An actuator assembly is operatively coupled to the friction clutch assembly and the dog clutch assembly to selectively move the first and second friction clutch members between the unengaged and torque transmitting positions, and to move the first and second dog members between the disengaged and engaged positions.

In accordance with another aspect of the disclosure, a composite clutch for transmitting an operational range of torques from a driving member to a driven member is provided having a friction clutch assembly. The friction clutch assembly includes a number of first friction clutch members coupled to the driving member and a number of second friction clutch members coupled to the driven member. A dog clutch assembly includes a first dog member coupled to the driving member, a second dog member coupled to the driven member, a dog arm slidably coupled to the second dog member, and a spring disposed between the dog arm and the second dog member biasing the dog arm in a retracted position spaced from the first dog member. An actuator assembly is operatively coupled to the dog clutch assembly to selectively cause the first and second friction clutch members to move between the unengaged and torque transmitting positions, and the first and second dog members to move between the disengaged and engaged positions.

A clutch control system for transmitting an operational range of torques from a driving member to a driven member is provided having a composite clutch with a friction clutch assembly and a dog clutch assembly. The composite clutch is operable in a friction clutch mode across a first portion of the operational range of torques and a dog clutch mode across a second portion of the operational range of torques. An actuator assembly includes a first actuator operatively coupled to the friction clutch assembly and a second actuator operatively coupled to the mechanical clutch assembly. A controller is operably coupled to the actuator assembly and programmed to switch from the friction clutch mode to a dog clutch mode at a transition point associated with a transition torque.

These and other aspects and features of the disclosure will become more apparent upon reading the following detailed description when taken into consideration in conjunction with the accompanied drawings.

Figure 1:
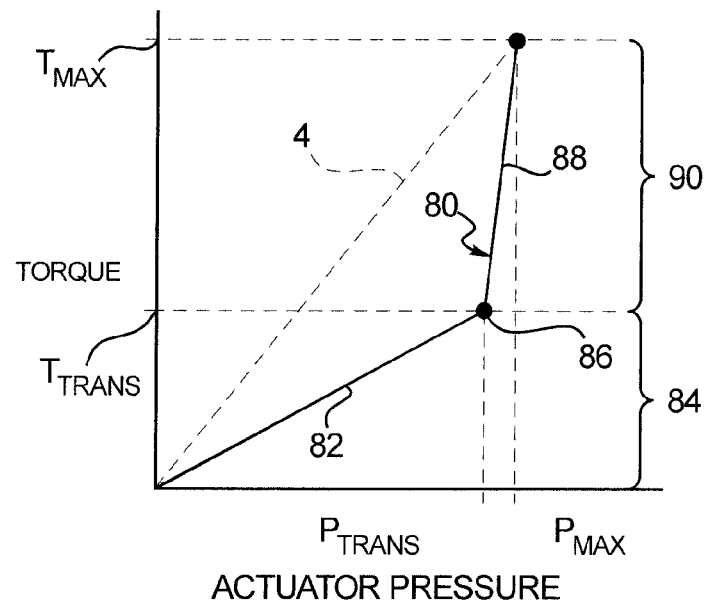
FIG. 1 is a graphical representation plotting torque vs. actuator pressure for a conventional friction plate clutch and a clutch according to the present disclosure.

While the present disclosure is susceptible to various modifications and alternative constructions, certain illustrative embodiments thereof are shown in the drawings and are described below in detail. It should be understood, however, that there is no intention to limit the present disclosure to the specific forms disclosed, but on the contrary, the intention is to cover all modifications, alternative constructions, and equivalents falling within the spirit of the scope of the present disclosure.

DETAILED DESCRIPTION

A composite clutch is disclosed herein that includes both a friction clutch assembly and a dog clutch assembly. The friction clutch assembly is used to transmit torque from a driving member to a driven member across a first or lower portion of the operational range of torques. The dog clutch assembly is used to transmit torque across a second or upper portion of the operational range of torques. As a result, the composite clutch provides the benefit of good shift feel from the friction clutch assembly with a high static torque capacity of a dog clutch. In addition, the number of plates needed in the friction clutch assembly is minimized, thereby reducing drag torque.

The composite clutch may be designed and/or controlled to switch from friction clutch mode to dog clutch mode at a desired transition point. The transition point may be selected according to desired operating parameters. Accordingly, output torque is better controlled across the lower portion of the operational range of torques.

Figure 2:
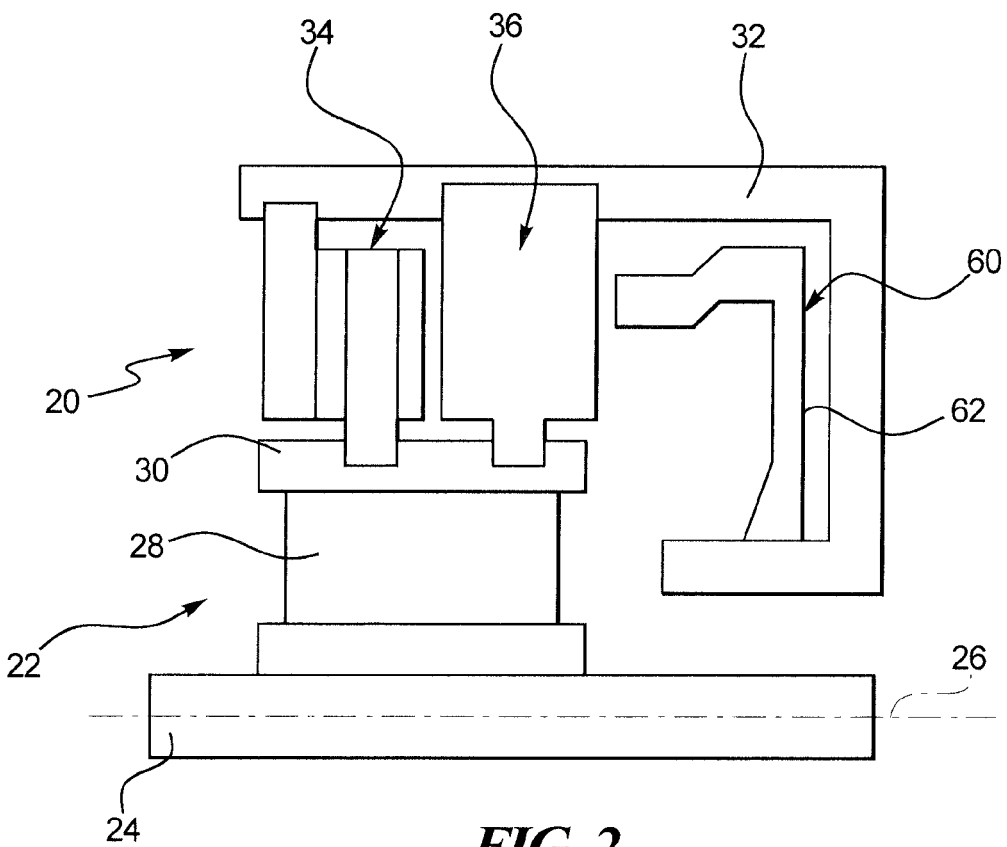
FIG. 2 is a schematic representation of one embodiment of a composite clutch constructed according to the present disclosure.

Referring now to the drawings, FIG. 2 provides a schematic representation of a composite clutch 20 in a portion of an automatic transmission 22. It is to be understood that the automatic transmission 22 is but one example of the setting in which the composite clutch 20 may be used. Other areas of a transmission, vehicle, machine tool, or other machine could also advantageously employ its teachings as will be readily understood by one of ordinary skill in the art.

As shown in FIG. 2, the transmission 22 may include a drive shaft 24 adapted to rotate about an axis 26, which is itself powered by the motive force of an engine (not shown) of a vehicle (also not shown). A hub 28 is attached to and rotates with the drive shaft 24. The hub 28 may be provided as a simple annular flange coupled to the drive shaft 24 or it may be configured to provide additional features or capabilities, such as a one-way clutch. An exterior peripheral surface of the hub 28 is formed with splines 30. The transmission 22 may also include a case or housing 32 which is mounted coaxially with the drive shaft 24 and is supported for rotation about the axis 26 independent of the drive shaft 24. According to this embodiment, the drive shaft 24 is the driving or input member while the housing 32 is the driven or output member.

Figure 5:
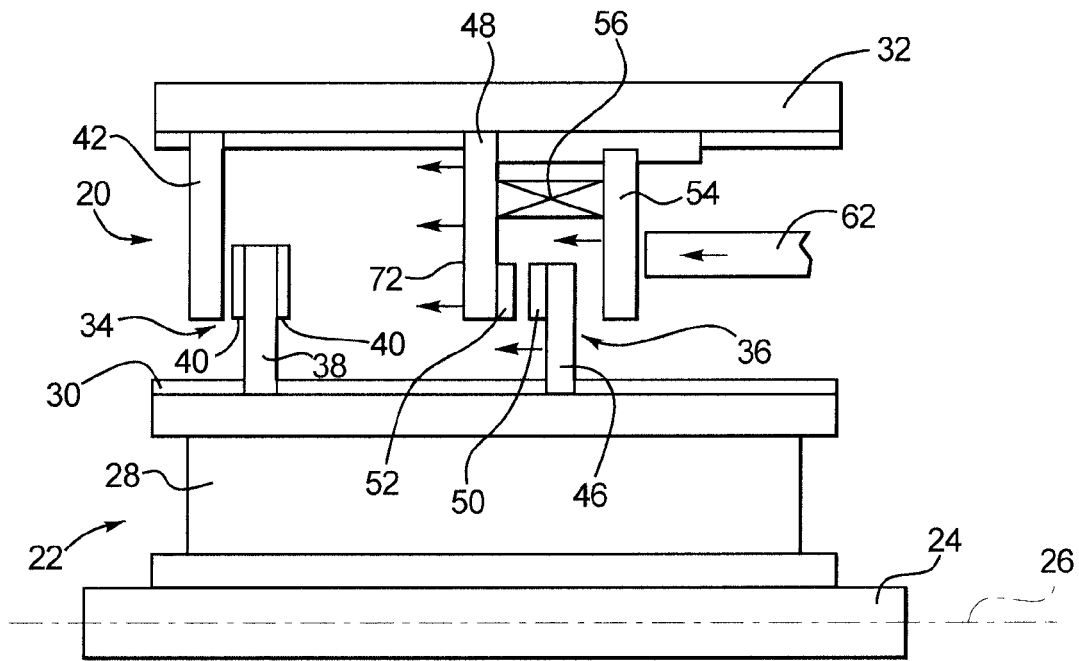
FIG. 5 is a schematic representation of still another embodiment of a composite clutch constructed according to the present disclosure.

Referring still to FIG. 2, the composite clutch 20 is provided to transfer torque from the hub 28 to the housing 32. The composite clutch 20 includes a friction clutch assembly 34 and a dog clutch assembly 36. The friction clutch assembly 34 may include sets of first and second friction members that may be placed in torque transfer engagement. For example, as best shown in FIG. 5, one or more inner friction plates 38 may be splined to the hub 28. Each inner friction plate 38 may include friction surfaces 40 on both sides of the plate. Alternatively, only one side of each inner friction plate may include a friction surface 40. Additionally, one or more outer friction plates 42 may be splined to the housing 32 such that each outer friction plate 42 is disposed between adjacent inner friction plates 38. The inner and outer friction plates 38, 42 are allowed to slide in an axial direction while remaining attached to and rotating with the hub 28 and housing 32, respectively. Accordingly, the plates 38, 42 are movable between an unengaged position, in which the plates 38, 42 do not contact each other, and a torque transmitting position, in which the plates 38, 42 engage each other with sufficient force to transmit torque from the inner plates 38 to the outer plates 42.

The dog clutch assembly 36 provides a selective mechanical coupling between the hub 28 and the housing 32. The dog clutch assembly 36 is movable between a disengaged position to an engaged position in which the dog mechanically connects the hub 28 to the housing 32. According to an exemplary embodiment illustrated in FIG. 5, the dog clutch assembly 36 may include a first dog member 46 splined to the hub 28 and a second dog member 48 splined to the housing 32. The first and second dog members 46, 48 have complementary locking surfaces 50, 52 configured to form a mechanically locked connection when engaged. A dog arm 54 may be slidably coupled to the second dog member 48, such as via splines, and a spring 56 may be disposed between the dog arm 54 and the second dog member 48 to hold the dog arm 54 in a retracted position spaced from the first dog member 46. When a force is applied to the dog arm 54 sufficient to collapse the spring 56, the dog arm 54 will slide toward the first dog member 46 and drive it into engagement with the second dog member 48, thereby mechanically connecting the hub 28 to the housing 32.

The friction clutch assembly 34 and dog clutch assembly 36 may be advantageously positioned in axial alignment relative to one another as illustrated in FIGS. 2 and 5. Such axial alignment will enable the composite clutch 20 to be used in the same space that is currently allocated for conventional friction plate clutches, thereby minimizing or avoiding changes to surrounding transmission components.

Figure 6:
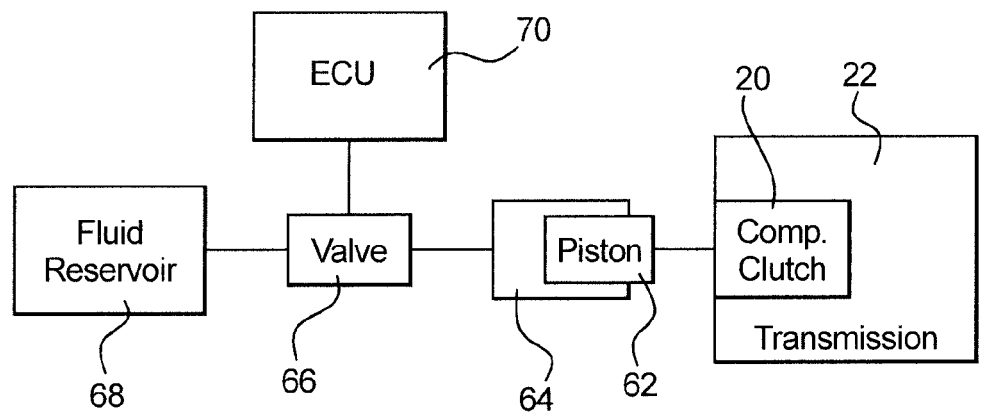
FIG. 6 is a schematic block diagram illustrating a clutch control system according to the present disclosure.

Returning to FIG. 2, an actuator assembly 60 is provided for actuating the friction clutch assembly 34 and the dog clutch assembly 36. In the illustrated embodiment, the actuator assembly 60 includes a hydraulic piston 62 operated by hydraulic fluid disposed in a chamber 64 disposed between the piston 62 and the housing 28. As illustrated schematically in FIG. 6, the chamber 64 fluidly communicates with a hydraulic valve 66, such as a solenoid valve. The valve 66, in turn, fluidly communicates with a reservoir 68 of hydraulic fluid. An electronic control unit 70 is operatively coupled to the valve 66 and is programmed to control operation of the valve 66.

The above-described composite clutch 20 is operable in both a friction clutch mode and a dog clutch mode. During operation, the piston 62 is actuated to engage the dog arm 54. Initially, the force generated by the piston 62 does not exceed the force of the spring 56, and therefore the second dog member 48 is translated axially toward the friction clutch assembly 34. If the distance between the friction clutch assembly 34 and dog clutch assembly 36 is sufficiently large as shown in FIG. 5, the dog arm 54 will also engage and slide the first dog member 46 toward the friction clutch assembly 34. Ultimately, a face 72 of the second dog member 48 will engage one of the friction clutch members, thereby to drive the inner and outer plates 38, 42 into engagement. In the illustrated embodiment, the second dog member 48 also functions as an outer friction plate 42. With sufficient piston force, the inner plates will frictionally engage the outer plates to transfer torque. Initially, the outer plates 42 will exhibit significant slippage with respect to the inner plates 38. Additional piston force, however, will reduce the slippage and increase the amount of torque transfer. The piston force may be further increased to a level at which it exceeds the force of the spring 56, thereby causing the dog arm 54 to drive the first dog member 46 into engagement with the second dog member 48. At this point, the hub 28 and housing 32 are mechanically locked via the dog clutch assembly 36.

A curve 80 is plotted on FIG. 1 to graphically illustrate the relationship of actuator pressure to torque for composite clutch 20. The curve 80 includes a first or slightly inclined segment 82 representing the friction clutch mode of operation. The friction clutch mode is used during a first or lower portion 84 of the operational range of torques. At a transition point 86, the composite clutch 20 switches to the dog clutch mode of operation, represented by the second or steeply inclined segment 88. The dog clutch mode is used during a second or upper portion 90 of the operational range of torques. In this embodiment, the transition point 86 is determined primarily by the force of the spring 56, which may be selected to achieve the desired result. For example, the spring 56 may be selected such that the lower portion 84 of the operational range of torques has a lower boundary of 0% of maximum torque to an upper boundary of 1-99% of maximum torque.

The relatively smaller slope of the first segment 82 indicates that the composite clutch 20 is less sensitive to changes in actuator pressure. As a result, the hydraulic valve 66 that controls hydraulic fluid flow into and out of the piston chamber 64 may be more reliably operated to achieve the desired torque transmission. For higher torques, however, controllability issues diminish and therefore the dog clutch assembly may advantageously be employed in that range of operation.

The number of inner and outer friction plates 38, 42 used in the composite clutch 20 may be selected to transmit torque across a desired portion of the operational range of torque transmission provided by the composite clutch 20. The amount of torque transmitted by a friction plate clutch assembly is determined by the following equation:

$$T = \mu \times P \times A \times R \times N$$

where,
T is torque,
μ is a coefficient of friction,
P is an actuator pressure,
A is an effective area of the actuator,
R is the mean radius of the friction plates, and
N is the number of plates.

In a typical automatic transmission application, the actuator pressure P, effective actuator area A, and mean plate radius R are fixed parameters, and therefore the number of plates used is often the only variable that can be altered to meet design requirements. In conventional friction plate clutches, the number of plates must be sufficient to achieve a maximum torque requirement. The composite clutch 20 described herein, however, is not so limited since the dog clutch assembly 36 is used to transfer torque in the upper portion of the operational range. Instead, the number of inner and outer friction plates may be selected such that they adequately transfer torque across only a portion of the operational torque range. Accordingly, significantly fewer plates may be used in the composite clutch 20. For example, it has been demonstrated that a conventional design using seven dual-sided inner friction plates and a corresponding number of outer plates may be replaced by a composite clutch 20 having a single, dual-sided friction plate surrounded by two outside separator plates, which is a plate reduction of approximately 85%.

Figure 3:
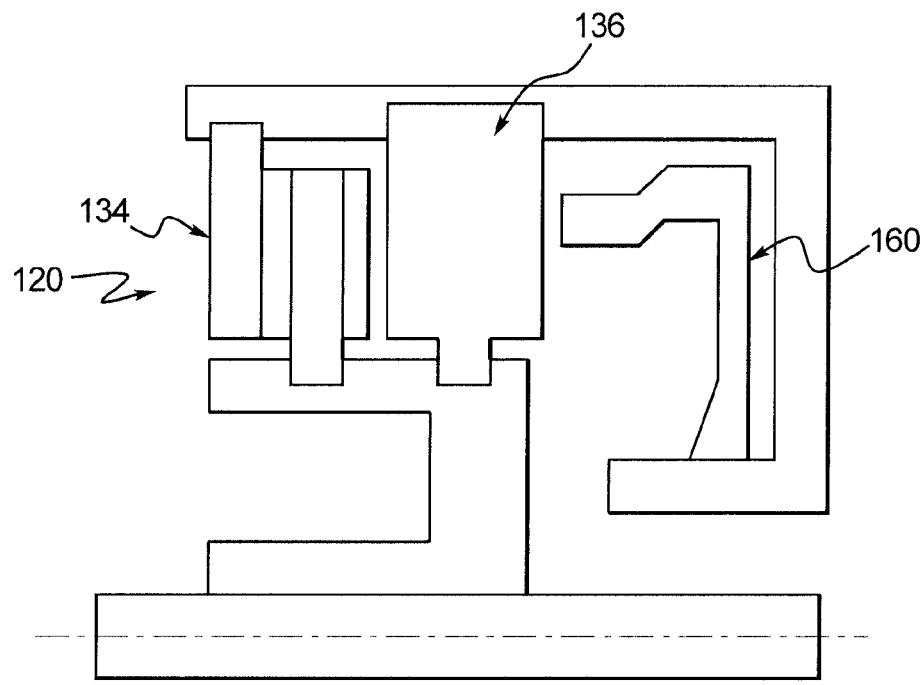
FIG. 3 a schematic representation of an additional embodiment of a composite clutch constructed according to the present disclosure.

An alternative embodiment of a composite clutch 120 is illustrated in FIG. 3. The composite clutch 120 largely identical to the composite clutch 20 described above, except that it includes a dog clutch 136 that incorporates a one-way clutch. The composite clutch also includes a friction clutch assembly 134 and actuator assembly 160 that are substantially the same as above.

Figure 4:
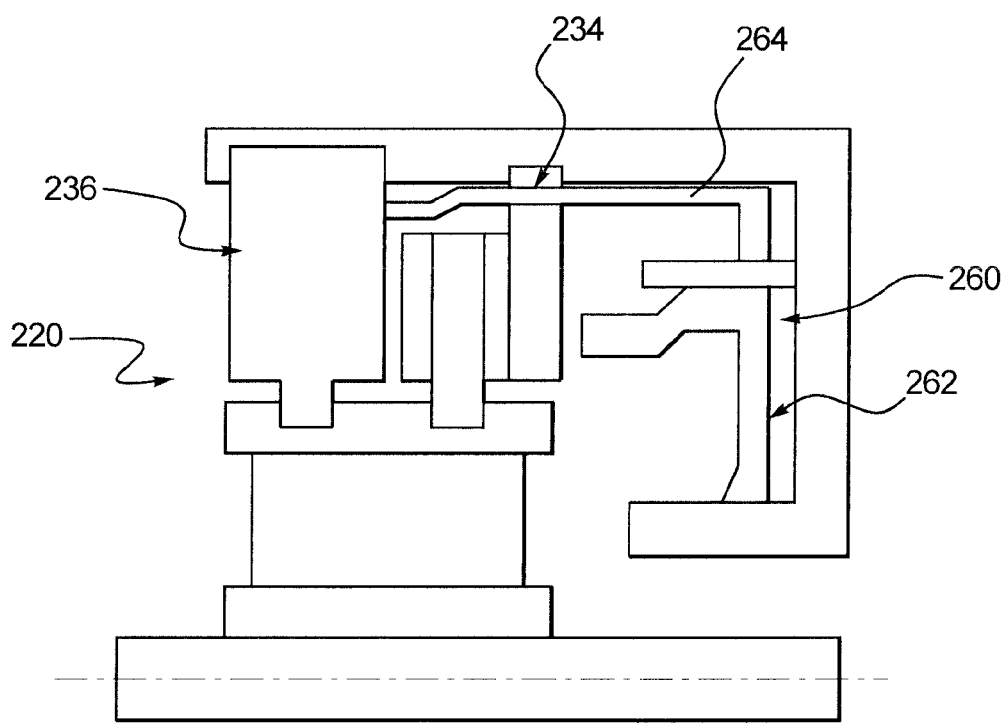
FIG. 4 is a schematic representation of yet another embodiment of a composite clutch constructed according to the present disclosure.

A further alternative embodiment of a composite clutch 220 is illustrated in FIG. 4 that incorporates a modified actuator assembly 260. The composite clutch 220 includes a friction clutch assembly 234 and a dog clutch assembly 236 that are substantially the same as the foregoing embodiments. The actuator assembly 260, however, includes a first piston 262 operatively coupled to the friction clutch assembly 234 and a second piston 264 operatively coupled to the dog clutch assembly 236. The first and second pistons 262, 264 are operable independent of one another, thereby eliminating the need for the spring 54 or a dog clutch that must slide to engage the friction clutch. The independently operable pistons 262, 264 allow greater control of the point at which the composite clutch 220 transitions from friction clutch mode to dog clutch mode. Furthermore, the transition point is no longer static but instead may be controlled to occur at different locations depending on operating parameters, thereby providing more flexible and precise control of the composite clutch 220.

The foregoing provides a composite clutch that can advantageously be used in a vehicle or other transmission. The composite clutch includes friction and dog clutch assemblies to enable operation in friction and dog clutch modes. The combination provides a smooth shift feel, improved controllability at lower torques, a high static torque capacity, and a low drag torque, while packaging the device in the space currently allocated for conventional clutches and using the same actuator currently available for conventional friction clutches. The composite clutch may be coupled to either a simple hub or a one-way clutch, which permits the following operational modes: (1) Locked in one direction, free-wheel in the opposite direction; (2) Low torque friction clutch in one direction; (3) Low torque friction clutch in both directions; and (4) Mechanical lock in both directions.

What is claimed is:

1. A composite clutch for transmitting an operational range of torques from a driving member to a driven member, comprising:

a friction clutch assembly including a number of first friction clutch members coupled to the driving member and a number of second friction clutch members coupled to the driven member;

a dog clutch assembly including a first dog member coupled to the driving member, a second dog member coupled to the driven member, a dog arm slidably coupled to the second dog member, and a spring disposed between the dog arm and the second dog member biasing the dog arm in a refracted position spaced from the first dog member; and an actuator assembly operatively coupled to the dog clutch assembly wherein the first and second friction clutch members are movable from an unengaged position to a torque transmitting position while a force supplied by the actuator assembly is less than a force required to compress the spring.

2. The clutch of claim 1, in which the force supplied by the actuator assembly corresponds to a first portion of the operational range of torques.

3. The clutch of claim 1, in which the first and second dog members are movable from a disengaged position to an engaged position while a force supplied by the actuator assembly is greater than a force required to compress the spring.

4. The clutch of claim 2, in which the force supplied by the actuator assembly corresponds to a second portion of the operational range of torques.

5. The clutch of claim 1, in which the actuator assembly causes the second dog member to engage the first clutch member to move the first and second clutch member into a torque transmitting position.

6. The clutch of claim 1, in which the actuator assembly causes the dog arm to engage the first dog member to move the first and second dog members into an engaged position.

7. The clutch of claim 1, in which the friction clutch assembly and dog clutch assembly are axially aligned.

* * * * *